United States Patent Office 3,430,307
Patented Mar. 4, 1969

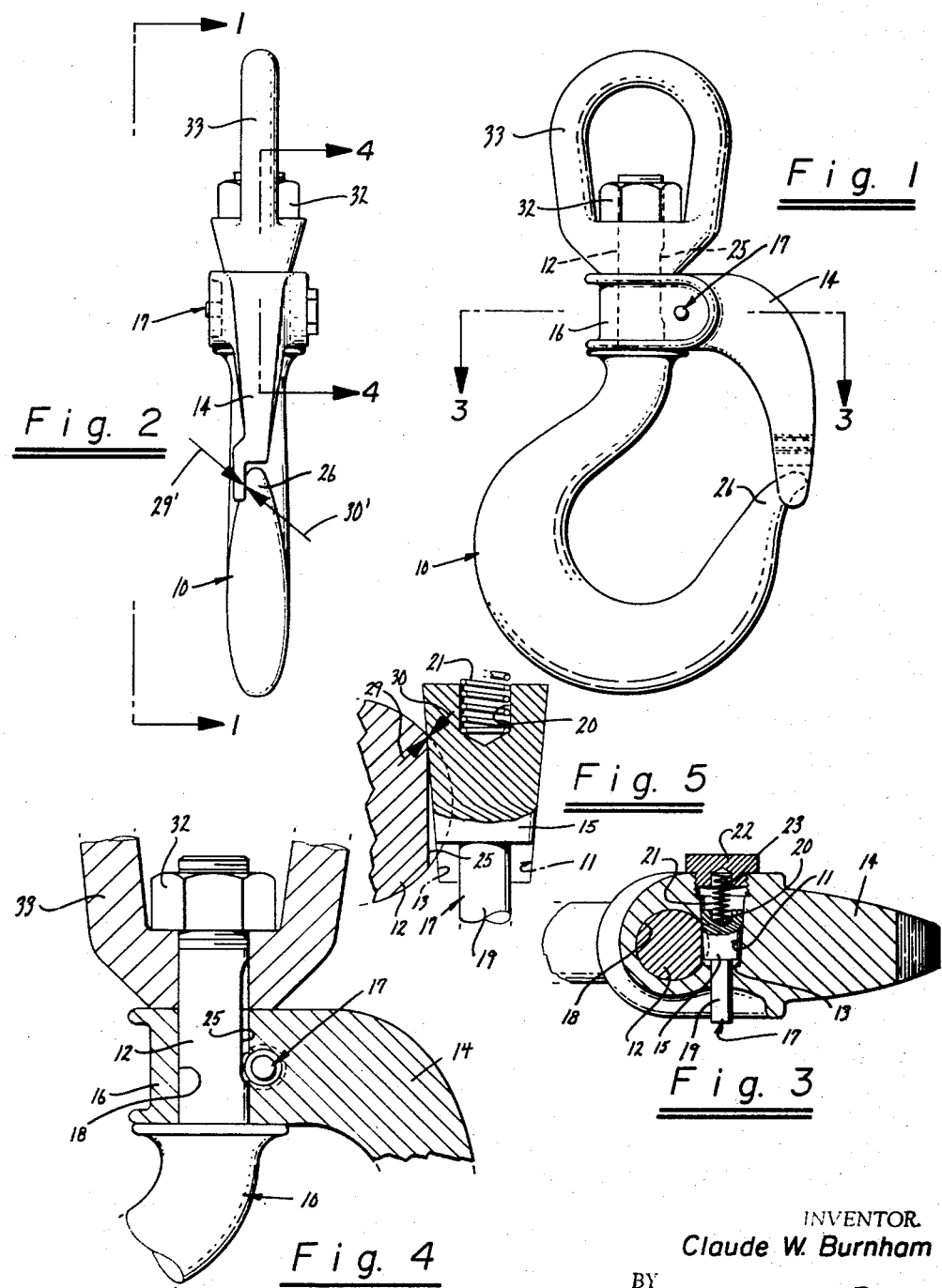
INVENTOR.
Claude W. Burnham

3,430,307
SAFETY HOIST HOOK
Claude W. Burnham, 4017 Edison Ave.,
Sacramento, Calif. 95821
Filed Dec. 20, 1967, Ser. No. 692,137
U.S. Cl. 24—241
Int. Cl. B66c 1/34
3 Claims

ABSTRACT OF THE DISCLOSURE

A hook including a safety arm mounted on a shank extension of the hook and rotatable into and out of bridging relationship with the throat of the hook, and a spring loaded safety pin slidably mounted in the arm for transversely engaging a recess on the shank to lock the arm in bridging relationship wherein the pin and mount therefor are axially tapered to provide a wedging, locking action between the shank recess, pin and pin mount.

---

The invention relates to safety hooks of the type illustrated in Patent No. 2,728,967. Safety hooks of the character described are generally preferred over other types in that the safety element or arm which bridges the hook throat can be quickly and easily manually released from a locked position by simple depression of the locking pin while at the same time the arm can be released from a locked position only by such an operation of the pin and by force applied in a direction which is ineffective in itself to move the arm out of throat-closing position. Thus, the safety hook is secure against spurious unlocking of the safety arm. However, it has been found that locking pin constructions of the type heretofore used have been limited by practical considerations to the smaller size hooks; and the locking pin construction has not been sufficiently strong, dependable and foolproof for use on the larger size hooks. In the latter case, some other type of locking device is used such as the provision of a gate which has a bifurcated end for straddling and positively locking with the tip of the hook. This style of gate lock is, however, not as convenient in use as the locking pin construction. Accordingly, it is an object of the present invention to provide a safety hoist hook having a locking pin construction which is designed to provide sure, more positive and stronger locking of the arm gate in the closed, throat bridging position, thus enabling the use of this preferred type of locking arrangement on hoist hooks of the larger sizes.

Another object of the present invention is to provide a hoist hook having a safety arm and lock therefor which automatically provides for increasing the holding and locking force as a function of force applied to urge the safety arm out of its throat-bridging position.

A further object of the present invention is to provide a safety hoist hook wherein the combination of parts cooperate in a manner enabling the use of greater tone in the parts while achieving the above-noted positive locking action, thus insuring interchangeability of stock parts, rapid repair and parts replacement, and decreased cost of manufacture.

Still another object of the present invention is to provide a hoist hook in which the critical locking parts thereof will have a very long, useful life due in part to a design in which the continued use of the hook and any accompanying wear-in of the parts serves to further improve the strength of the locking feature.

It is still another object of the present invention to provide a rugged safety hook which is less susceptible to destruction or damage during use.

The invention possesses other objects and features of advantage, some of which of the foregoing will be set forth in the following description of the preferred form of the invention which is illustrated in the drawing accompanying and forming part of this specification. It is to be understood, however, that variations in the showing made by the said drawing and description may be adopted within the scope of the invention as set forth in the claims.

Referring to said drawing:

FIGURE 1 is a front elevation of a safety hoist hook, constructed in accordance with the present invention and as viewed from the position suggested by lines 1—1 of FIGURE 2;

FIGURE 2 is a side elevation of the safety hook;

FIGURE 3 is a sectional view taken along line 3—3 of FIGURE 1;

FIGURE 4 is a fragmentary sectional view taken along line 4—4 of FIGURE 2;

FIGURE 5 is an enlarged fragmentary sectional view of a portion of the hook shown in FIGURE 3.

In general, the invention includes a hook 10 having a shank extension 12 (best shown in FIGURE 4), a safety arm 14 provided with a hub 16 rotatably mounted on shank 12 such that arm 14 may be rotated into and out of bridging relationship with a throat 18, and a locking pin 17 slidably mounted within an opening 11 in hub 16 for engagement with shank 12 in order to lock arm 14 in bridging position. In accordance with the present invention, hub 16 and locking pin 17 are formed with slideably cooperating frusto-conical internal and external wall portions 13 and 15 (best shown in FIGURE 3), respectively, for providing a wedging, locking engagement between shank 12 and wall portions 13 and 15 upon movement of pin 17 into a locked position. Frusto-conical wall portion 13 is positioned to transversely intersect an internal cylindrical wall 18 of hub 16 so as to expose shank 12 for engagement with wall portion 15 of pin 17.

Referring particularly to FIGURE 3, locking pin 17 in addition to frusto-conical or tapered wall portion 15, is formed with a stem portion 19 axially extending from the small end of wall portion 15 and projecting outwardly from hub 16 for manual inward depression thereof so as to provide a means for forcing wall portion 15 out of engagement with shank 12. Furthermore, the large end of wall portion 15 of pin 17 is provided with a recess 20 positioned to receive a spring 21 mounted in compression between pin 17 and a cap 22 which is also provided with a spring receiving recess 23 and is formed to threadedly engage hub 16.

Shank 12 includes a generally flat and longitudinally extending peripheral chordal surface 25 oriented thereon to cooperatively lock with pin 17 when hub 16 is rotated to bring arm 14 into closed bridging relationship with a tip 26 of book 10 as shown in the drawings. Accordingly, by this arrangement, spring 21 resiliently urges wall portion 15 into a generally wedging engagement with surface 25 when arm 14 is in the throat bridging or closed relationship. In order to release arm 14 from this position, it is merely necessary to manually depress stem portion 19 of pin 17 inwardly toward hub 16 so as to disengage wall portion 15 from surface 25 allowing hub 16 to easily rotate about shank 12 with the small end edge of pin 17 resting on the round portion thereof.

This construction, with frusto-conical or tapered wall portions 13 and 15, achieves a locking action against rotation between hub 16 and shank 12 which to a large degree eliminates any play therebetween and increases the locking force. The fact that arm 14 remains securely and snugly abutting tip 26 of hook 10 is, of course, a desirable feature, in that the purpose of arm 14 is to prevent accidental release of cables or the like from the interior boundaries of hook 10. It is apparent that, if hook 10 were used with relatively small diameter steel cables, for example, any play or loose relationship between arm 14 and tip 26 in the locked position thereof would increase the probability of allowing the cable to slip therebetween defeating the purpose of the device.

The firm and secure locking action provided by the present invention is attributable to the sloping walls of wall portions 13 and 15 respectively of hub 16 and pin 17. Specifically, any play which appears in the engagement between surface 25 and the above-mentioned wall portions is immediately taken up by increased seating of pin 17 caused by the force of spring 21. The particular wedging, locking action is best illustrated in FIGURE 5, showing surface 25 engaging wall portion 15 of pin 17. It is noted that in the preferred form of the invention, wall portion 15 contacts and engages a portion of surface 25 proximate the larger end of wall portion 15, setting of a pair of counteracting forces 29 and 30. Force 29 provided by surface 25 is opposed by force 30 exerted by pin 17, the combination of which sets up a further opposing pair of forces 29' and 30' shown in FIGURE 2, holding arm 14 against tip 26. Also the orientation of forces 29 and 30 indicating force components parallel with the contacting surface of wall portion 15 and surface 25 illustrate the above mentioned wedging action therebetween.

In this same vein, it is noted that as the parts of the hook wear, particularly wall portions 13 and 15 and surface 25, pin 17 will continually take up play caused by such wear by being forced further into its seat. Moreover, as this take-up occurs, an increasingly larger diameter or cross section of wall portion 15 is introduced into engagement with surface 25 so as to strengthen the locking action rather than weakening it as might be expected.

As a further advantageous feature of the present invention, the wedging, locking action of pin 19 with hub 16 and shank 12 exhibits an automatically increasing locking operation as arm 14 is forcefully urged away from tip 26. That is, while pin 19 is in a locked position in engagement with surface 25, and arm 14 receives a force tending to rotate hub 16 in a direction shown by arrow 28, pin 19 together with frusto-conical wall portion 15 is further wedged into engagement with increasingly larger portions of surface 25 thus accentuating the locking action in proportion to the magnitude of such force. Of course, arm 14 is prevented from rotating in a direction opposite that of arrow 28 due to the engagement thereof against tip 26 of hook 10.

As a further advantage of the invention, the particular cooperation of frusto-conical wall portions 13 and 15 allow the component parts thereof to be manufactured with large dimensional tolerances. That is, the locking mechanism of the instant invention will provide secure locking of assembled arm 14 even though each individual part, particularly pin 17 hub 16 or shank 12, by itself does not precisely conform to the design dimensions. For example, if these parts when assembled are relatively loose fitting, wall portion 15 of pin 17 will seat further within internal wall portion 13 so as to take up the slack. This feature not only insures interchangeability of stock parts, eliminating special fitting, but also decreases the cost of manufacture and tolerance controls.

I claim:

1. In a safety hoist hook of the type including a cylindrical shank, an arm provided with a hub having an internal cylindrical wall rotatably engaging said shank for bringing said arm into and out of bridging relationship with the throat of said hook, said hub formed with an opening extending therethrough transverse to the longitudinal axis of said shank and partially intersecting said internal cylindrical wall, a pin slideably mounted in said opening to allow engagement and disengagement thereof with a chordal surface formed and positioned on said shank for maintaining said arm in said bridging relationship during said engagement, and a spring positioned in said opening for biasing said pin into engagement with said surface; wherein the improvement resides in said pin being formed with an external frusto-conical wall portion and said opening being formed with a mated internal frusto-conical wall portion for providing a cooperative wedging, locking engagement between said surface and wall portions upon movement of said pin into engagement with said surface.

2. The device of claim 1 wherein said pin is additionally formed with a stem portion axially extending from the small end of said external wall portion and projecting outwardly from said hub for manual inward depression thereof to release said wedging-locking engagement, and said hub is formed with an outwardly extending integral ridge positioned proximate said outwardly extending stem portion to provide a guard against inadvertent impact.

3. The device of claim 1 wherein said frusto-conical wall portions narrow toward the direction of movement of said arm out of said bridging relationship, whereby said wedging, locking engagement automatically increased upon attempted forceful rotation of said arm out of said bridging relationship.

References Cited

UNITED STATES PATENTS 1,334,830   3/1920   Bastord.
1,669,805   5/1928   Beer.

BERNARD A. GELAK, *Primary Examiner.*